United States Patent
Knapp

(10) Patent No.: US 10,260,498 B2
(45) Date of Patent: Apr. 16, 2019

(54) SYSTEMS AND METHODS FOR SECURING MAGNETIC COILS IN DOWNHOLE LINEAR MOTORS

(71) Applicant: Baker Hughes Incorporated, Houston, TX (US)

(72) Inventor: John M. Knapp, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 311 days.

(21) Appl. No.: 15/146,571

(22) Filed: May 4, 2016

(65) Prior Publication Data

US 2016/0372994 A1    Dec. 22, 2016

Related U.S. Application Data

(60) Provisional application No. 62/180,959, filed on Jun. 17, 2015.

(51) Int. Cl.

| | |
|---|---|
| *E21B 43/12* | (2006.01) |
| *F04B 47/06* | (2006.01) |
| *H02K 3/46* | (2006.01) |
| *H02K 41/02* | (2006.01) |
| *H02K 1/34* | (2006.01) |
| *H02K 15/00* | (2006.01) |

(52) U.S. Cl.
CPC ............ *F04B 47/06* (2013.01); *E21B 43/128* (2013.01); *H02K 1/34* (2013.01); *H02K 3/46* (2013.01); *H02K 15/00* (2013.01); *H02K 41/02* (2013.01)

(58) Field of Classification Search
CPC ........ E21B 43/12; E21B 43/128; F04B 47/06; H02K 3/46; H02K 15/00; H02K 41/02
See application file for complete search history.

(56) References Cited

U.S. PATENT DOCUMENTS

| | | | | |
|---|---|---|---|---|
| 4,833,354 | A | * | 5/1989 | Miller ...................... H02K 3/38 310/260 |
| 5,195,231 | A | | 3/1993 | Fanning |
| 5,734,209 | A | * | 3/1998 | Hallidy ................. E21B 43/128 310/12.04 |
| 5,960,875 | A | | 10/1999 | Beauquin |
| 7,633,187 | B2 | | 12/2009 | Kim |
| 7,633,189 | B2 | * | 12/2009 | Iwasa ..................... H02K 41/03 310/14 |

(Continued)

FOREIGN PATENT DOCUMENTS

JP    S61180552    8/1986

*Primary Examiner* — Yong-Suk Ro
(74) *Attorney, Agent, or Firm* — Sprinkle IP Law Group

(57) ABSTRACT

Systems and methods for securing coils of magnet wire to a support core in a linear motor that is used, for example, in an ESP. A hollow member such as a cylindrical metal tube is provided as a support core which is adapted to receive a mover of the linear motor. Coils of magnet wire are positioned at the exterior of the support core (e.g., wound around the core). An outer layer of shrink-wrap material is placed around the support core and coils and is heated, causing it to shrink and conform to the coils and the support core. The shrink-wrap material provides pressure against the coils which holds them securely against the support core. This assembly is then positioned within a stator housing and secured to form the stator for the linear motor.

16 Claims, 4 Drawing Sheets

(56) References Cited

U.S. PATENT DOCUMENTS

| | | | |
|---|---|---|---|
| 7,679,242 B2* | 3/2010 | Parmeter | F04D 13/10 |
| | | | 310/184 |
| 7,859,144 B1 | 12/2010 | Sahyoun | |
| 8,987,952 B2* | 3/2015 | Dutau | H02K 9/06 |
| | | | 310/61 |
| 9,093,876 B2* | 7/2015 | Knapp | H02K 5/132 |
| 9,260,954 B2* | 2/2016 | Filippov | H02K 33/16 |
| 2004/0263001 A1 | 12/2004 | Yamanaka | |
| 2007/0096571 A1* | 5/2007 | Yuratich | E21B 43/128 |
| | | | 310/87 |
| 2010/0187942 A1* | 7/2010 | McCartney | H02K 3/50 |
| | | | 310/214 |
| 2011/0044831 A1 | 2/2011 | Cunningham | |
| 2012/0063934 A1* | 3/2012 | Rumbaugh | F04B 47/06 |
| | | | 417/410.1 |
| 2013/0186638 A1 | 7/2013 | Filippov | |

* cited by examiner

SYSTEMS AND METHODS FOR SECURING MAGNETIC COILS IN DOWNHOLE LINEAR MOTORS

CROSS-REFERENCE TO RELATED APPLICATIONS

This application claims the benefit of U.S. Provisional Patent Application 62/180,959, filed Jun. 17, 2015 by John M. Knapp, which is incorporated by reference as if set forth herein in its entirety.

BACKGROUND

Field of the Invention

The invention relates generally to downhole tools for use in wells, and more particularly to means for securing coils of magnet wire in the stator of a linear motor.

Related Art

In the production of oil from wells, it is often necessary to use an artificial lift system to maintain the flow of oil. The artificial lift system commonly includes an electric submersible pump (ESP) that is positioned downhole in a producing region of the well. The ESP has a motor that receives electrical signals from equipment at the surface of the well. The received signals run the motor, which in turn drives a pump to lift the oil out of the well.

ESP motors may use rotary designs in which a rotor is coaxially positioned within a stator and rotates within the stator, or linear designs in which a mover moves in a linear, reciprocating motion, driving a plunger-type pump to force oil out of the well. Both rotary and linear motors use coils of magnet wire that are energized to create magnetic fields. These magnetic fields interact with magnetic fields of the motor's rotor (in the case of a rotary motor) or mover (in the case of a linear motor), thereby causing the rotor or mover to move. This movement is used to drive the system's pump.

In the case of rotary motors, the coils are typically positioned in axially oriented slots in a stator core, and are thereby prevented from moving as they cause the rotor to rotate. In the case of linear motors, the coils are commonly wrapped annularly around the bore of the stator, so the reactive force on the coils as they drive the mover to reciprocate may cause the coils to move axially. This movement may result in abrasion of the wires and may lead to short circuits or other electrical failures of the coils.

It would therefore be desirable to provide improved means to reduce or prevent the movement of the coils in a linear motor, thereby increasing the reliability and working life of the motor.

SUMMARY OF THE INVENTION

This disclosure is directed to systems and methods for securing coils of magnet wire to a stator support core in a manner that solves one or more of the problems discussed above. One particular embodiment is a method for securing coils of magnet wire to a support core in a linear motor that may be used, for example, in an ESP. In this method, a support core is provided. The support core is a hollow member such as a cylindrical metal tube which is adapted to receive a mover of the linear motor therein. A set of coils of magnet wire are positioned at the exterior of the support core. In one embodiment, the magnet wire is wound around the support core to form the coils. A layer of material may be placed over the support core to help prevent the coils from moving axially on the support core (in the direction of the axis of the support core) and to provide additional electrical insulation between the coils and the support core. This layer of material may be formed with shrink-wrap material that is heated to shrink it and secure it on the support core. After the coils of magnet wire are positioned on the support core, an outer layer of shrink-wrap material is placed around the support core and the coils. The outer layer of shrink-wrap material is then heated to cause it to shrink and conform to the coils and the support core. The outer layer of shrink-wrap material provides pressure against the coils which holds the coils securely against the support core. This assembly may then be positioned within a stator housing and secured to form the stator for the linear motor.

An alternative embodiment comprises a system that includes an ESP, an electric drive and a power cable coupled between them to carry power from the electric drive to the ESP. The ESP has a linear motor. The stator of the linear motor includes a support core which is a hollow member adapted to receive a mover of the linear motor within a bore of the support core. Coils of magnet wire are positioned at the exterior of the support core, and an outer layer of shrink-wrap material is positioned around the support core and the coils. The outer layer of shrink-wrap material is conformed to the support core and the coils of magnet wire by heating it. This also compresses the layer of shrink-wrap material against the coils and thereby holds them securely against the support core. A layer of non-slip material may optionally be positioned between the support core and the coils of magnet wire to inhibit axial movement of the coils with respect to the support core. The layer of non-slip material may be formed by an inner layer of shrink-wrap material that is conformed to the support core. The coils of magnet wire may be formed by winding the magnet wire around the support core and the inner, non-slip layer. Alternately, the coils may be pre-formed and then installed over the support core. The outer layer of heat shrink may then be applied to hold the coils in position. The stator, including the coils of magnet wire may be encapsulant-free, so that the stator components can be repaired or reused.

Another alternative embodiment comprises a stator that is suitable for use in a linear motor. The stator includes a support core which is a hollow structural member adapted to receive a mover of the linear motor. A set of coils of magnet wire are positioned on the exterior of the support core, and an outer layer of shrink-wrap material positioned around the support core and coils to hold the coils in position. The outer layer of shrink-wrap material is conformed to the support core and the coils of magnet wire by heating it. This causes the outer layer of shrink-wrap material to be compressed against the coils of magnet wire so that they are held securely against the support core without the need for encapsulants. A layer of non-slip material (such as shrink-wrap material) may be positioned between the support core and the coils of magnet wire to inhibit axial movement of the coils with respect to the support core. The coils may be formed by winding the magnet wire around the support core.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
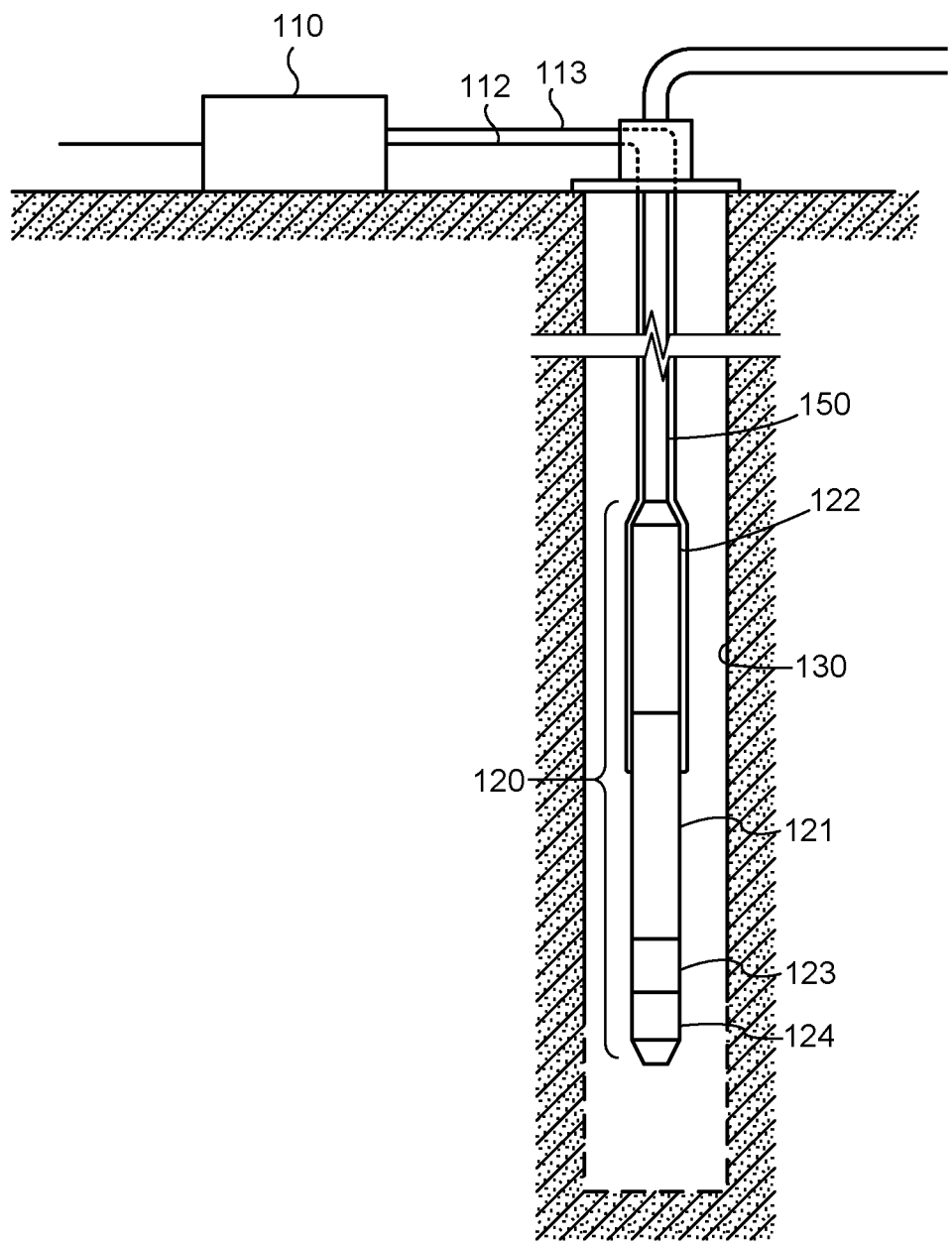
FIG. 1 is a diagram illustrating an exemplary pump system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for securing coils of magnet wire in the stator of a linear motor. Generally speaking, in the present systems and methods, the coils are installed on an inner support core in a conventional manner. After the coils are installed on the stator's inner support core, however, an outer layer of heat-shrink material is positioned over the coils and is heated to shrink the material onto the coils. The heat-shrink material conforms to the coils on the inner support core and holds the coils securely against the support core. An inner layer of heat-shrink material may also be positioned on the inner support core and shrunk onto the support core prior to installation of the coils to help prevent movement between the coils and the support core. The inner layer of heat shrink may also provide electrical insulation between the inner core and the coils. With the heat-shrink material securing the coils to the inner support core, the assembly is installed in the stator housing.

Referring to FIG. 1, a diagram illustrating an exemplary pump system in accordance with one embodiment of the present invention is shown. A wellbore 130 is drilled into an oil-bearing geological structure and is cased. The casing within wellbore 130 is perforated in a producing region of the well to allow oil to flow from the formation into the well. Pump system 120 is positioned in the producing region of the well. Pump system 120 is coupled to production tubing 150, through which the system pumps oil out of the well. A control system 110 is positioned at the surface of the well. Control system 110 is coupled to pump 120 by power cable 112 and a set of electrical data lines 113 that may carry various types of sensed data and control information between the downhole pump system and the surface control equipment. Power cable 112 and electrical lines 113 run down the wellbore along tubing string 150.

Pump 120 includes an electric motor section 121 and a pump section 122. In this embodiment, an expansion chamber 123 and a gauge package 124 are included in the system. (Pump system 120 may include various other components which will not be described in detail here because they are well known in the art and are not important to a discussion of the invention.) Motor section 121 receives power from control system 110 and drives pump section 122, which pumps the oil through the production tubing and out of the well.

In this embodiment, motor section 121 is a linear electric motor. Control system 110 receives AC (alternating current) input power from an external source such as a generator (not shown in the figure), rectifies the AC input power, converting it to DC (direct current) voltage of a specific value as determined by the controller which may be used to produce three-phase AC output power, switched DC power, or other waveforms, such as sawtooth waveforms, which are suitable to drive the linear motor. The output power generated by control system 110 is dependent in part upon the electrical position of the mover within the stator of the linear motor. Electrical position sensors in the motor may sense the position of the mover and communicate this information via electrical lines 113 to control system 110 so that electrical currents are properly and timely commutated (as will be discussed in more detail below). The output power generated by control system 110 is provided to pump system 120 via power cable 112.

Figure 2:
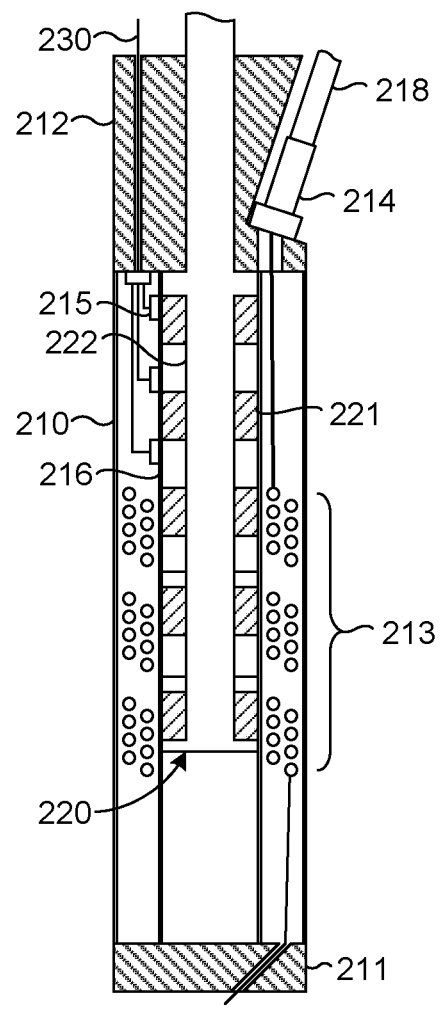
FIG. 2 is a diagram illustrating an exemplary linear motor in accordance with one embodiment which would be suitable for use in the pump system of FIG. 1.

Referring to FIG. 2, a diagram illustrating an exemplary linear motor which would be suitable for use in the pump system of FIG. 1 is shown. The linear motor has a cylindrical stator 210 which has a bore in its center. A base 211 is connected to the lower end of stator 210 to enclose the lower end of the bore, and a head 212 is connected to the upper end of the stator. Motor head 212 has an aperture therethrough to allow the shaft 222 of the mover 220 to extend to the pump.

Stator 210 has several coils (e.g., 213) of electrically conductive magnet wire that are positioned around an inner support core 216 that forms the bore of the stator. The coils form multiple poles within the stator. The number of coils and the number of poles may vary from one embodiment to another. The ends of the windings are coupled (e.g., via a pothead connector 214) to the conductors of the power cable 218. Although the power cable has separate conductors that carry the power to the motor, the conductors are not depicted separately in the figure for purposes of simplicity and clarity.

The windings are alternately energized by the current received through the power cable to generate magnetic fields within the stator. These magnetic fields interact with permanent magnets 221 on the shaft 222 of mover 220, causing mover 220 to move up and down within the motor. The waveform of the signal provided by the drive via the power cable is controlled to drive mover 220 in a reciprocating motion within the bore of stator 210. Stator 210 may incorporate one or more Hall-effect sensors 215 to monitor the physical position of mover 220 within stator 210.

Figure 3:
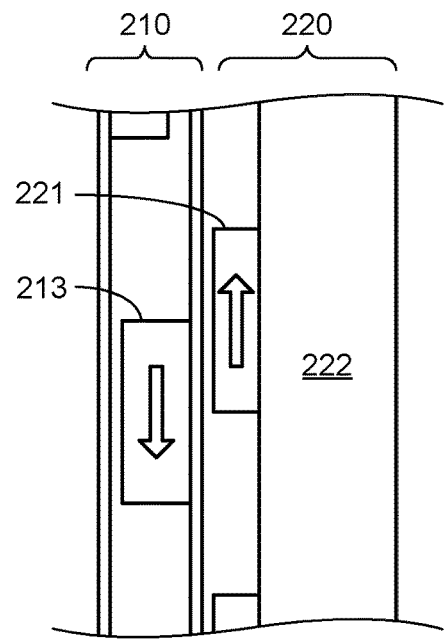
FIG. 3 is a diagram illustrating opposing forces acting on the stator and mover of a linear motor in one embodiment.

Referring to FIG. 3, a diagram illustrating some of the forces on the motor is shown. As noted above, when the coils are energized, they generate magnetic fields that interact with those of the permanent magnets on the mover. FIG. 3 depicts a point in the upward stroke of the motor. The coils exert an upward force (represented by the upward facing arrow) on the mover which urges the mover upward. At the same time, a reactive force (represented by the downward facing arrow) is exerted on the coils. On the downward stroke of the motor, the opposite forces are exerted on the mover and coils.

Ideally, the coils are secured against the inner support core and cannot move, while the mover is free to move within the bore of the stator (except for the resistance of the pump shaft). In reality, however, it may be difficult to secure the coils of the stator, and they may move in response to the forces exerted by the magnetic fields. This movement may cause wear on the magnet wires that may result in failure of the coils.

In the prior art, the coils may be mechanically restrained by encapsulating them with epoxy or varnish encapsulants that are liquid or semi-liquid when introduced into the stator and then harden to form a substantially rigid material in which the coils are embedded. The coils may also be physically tied or banded to a rigid member within the stator. These methods, however, may be unsatisfactory for a number of reasons. In the case of the varnish or epoxy encapsulant methods, a considerable amount of equipment is required to handle the varnish and epoxy chemicals, and substantial time and resources may be required to cure these encapsulants. Further, each of these processes generates a waste stream with which the manufacturer has to contend. Still further, it may be difficult or even impossible to remove the encapsulants to allow repair or reuse of the stator components. In the case of tying or otherwise mechanically restraining the coils, significant labor and skill may be required to successfully secure the coils, and the quality of the restraint may be less than desired.

The present systems and methods provide an encapsulant-free alternative to prior art methods for restraining the coils of a linear stator. The present systems and methods generate no waste stream, and require no complicated equipment and no specialized knowledge. Additionally, the materials used in the present systems and methods are less likely to degrade in the high temperatures that exist in many well environments. The present systems and methods also facilitate rework or repair of coils that is difficult or impossible when methods such as varnish or epoxy encapsulation are used.

Figure 4:
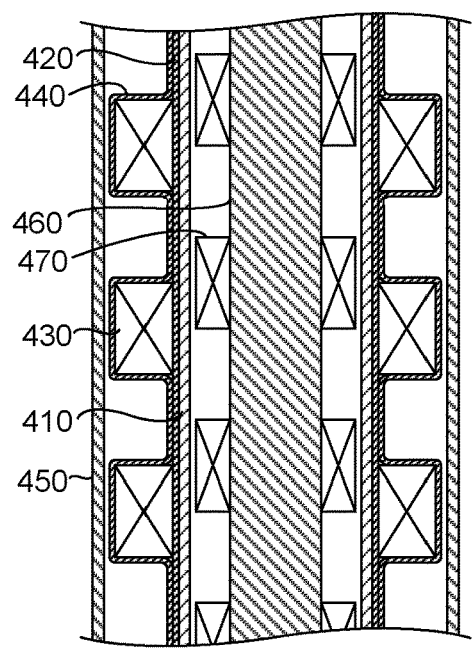
FIG. 4 is a diagram illustrating the internal arrangement of the components of a linear motor and the positions of the heat shrink insulations in a linear electric motor in accordance with one embodiment.

Referring to FIG. 4, a diagram illustrating the construction of a stator for a linear electric motor in accordance with one embodiment is shown. In this embodiment, the stator is constructed around an inner support core 410. Inner support core 410 is a cylindrical metal tube. The interior of inner support core 410 forms a bore through the stator in which a mover will be positioned. A first, inner layer 420 of shrink-wrap material such as PEEK, PTFE or FEP is placed over (around) inner support core 410 and is heated to shrink the material onto the inner support core. The shrinking of the material causes it to form a smooth, even layer on the exterior of inner support core 410. This also causes inner layer 420 to fit tightly on inner support core 410 so that it does not move on the inner support core.

Magnet wires are then wound around inner support core 410 on top of inner layer 420 to form one or more coils 430. Although not explicitly depicted in the figure, annular spacers may be positioned between the coils to help maintain the position of the magnet wires. After the magnet wires have been wound to form coils 430, a second, outer layer 440 of shrink-wrap material (e.g., PEEK, PTFE or FEP) is positioned over (around) coils 430. Outer layer 440 is then heated to shrink the material onto coils 430. This conforms the shrink-wrap material to the coils and provides a compression that holds them securely against inner layer 420. Inner layer 420 serves as a non-slip surface that provides additional friction between coils 430 and inner support core 410 (as compared to an embodiment in which the coils are wrapped directly onto the inner support core) to help prevent movement between them (e.g., axial movement of the coils with respect to the support core). The two layers of shrink-wrap material thereby hold coils 430 in place on inner support core 410. This assembly is then positioned within an outer housing 450, which in this embodiment is a cylindrical metal tube, and secured in the housing. A mover having a shaft 460 and permanent magnets 470 may be positioned in the bore of the inner support core before the inner stator assembly is enclosed in the housing.

It should be noted that, although an inner layer of shrink-wrap material is used in the embodiment of FIG. 4, this is not necessary in alternative embodiments. The inner layer helps to cushion the coils on the inner support core and helps to prevent movement of the coils on the inner support core, as well as providing a layer of insulation between the coils and the inner support core. In alternative embodiments, this inner layer of shrink-wrap material may not be used, or it may be replaced by other material, such as conventional electrically insulating films.

Figure 5:
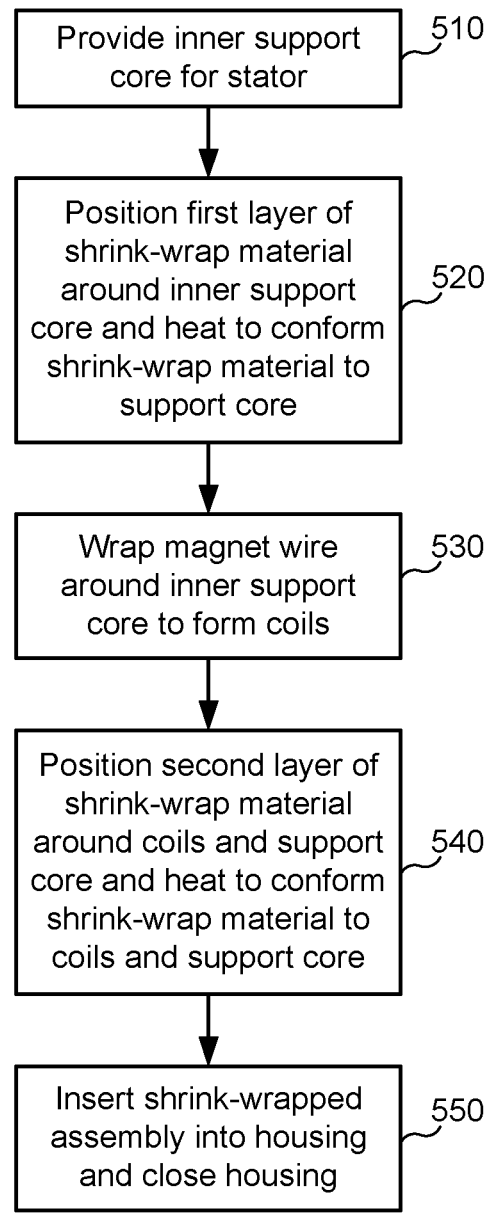
FIG. 5 is a flow diagram illustrating a method for insulating and restraining the magnet coils within the stator using heat shrink insulation in a linear motor in accordance with one embodiment.

Alternative embodiments may include, for example, methods for constructing stators for linear motors. One exemplary method is illustrated in the flow diagram of FIG. 5. In this method, an inner support core is provided (510). A first layer of tubular shrink-wrap material is placed over the inner support core and is heated to shrink the material onto the inner support core (520). Magnet wires are then wrapped around the inner support core on top of the inner shrink-wrap layer to form the coils of the stator (530). After the coils have been formed, a second layer of tubular shrink-wrap material is placed over the coils and is heated to shrink the material onto the coils (540). This assembly is then inserted into a cylindrical stator housing and is secured within the housing (550).

The present systems and methods may have a number of advantages over the prior art. For instance, they are much simpler and easier to implement than many prior art methods. Methods that involve encapsulation of the coils in varnish or epoxy require machinery to prepare and/or inject these materials into the stator housing, and may require additional components within the stator housing to contain these materials as they cure. Further, manufacturing personnel may need specialized training to perform these processes. In addition to the complexities associated with actually applying the encapsulant to the coils, there are difficulties associated with the handling of the waste streams that are generated in the process. When the present systems and methods are used, on the other hand, it is only necessary to position a piece of the shrink-wrap material in the desired position (over the inner support core or over the coils) and to heat the material. No specialized machinery or skills are required, and no waste is generated.

Another advantage of the present systems and methods is that they facilitate reuse and repair of stators. If a stator has coils that have been encapsulated in epoxy or varnish, it is difficult to remove the encapsulant so that defective or failed components can be replaced. Further, it may be difficult to dispose of the removed encapsulant or materials that are used in the removal of the encapsulant. When shrink-wrap material is used to restrain the coils, the material can simply be cut off and thrown away. The remaining components of the stator can then be easily reused or replaced. Thus, while the shrink-wrap material surrounds the coils and the support core, it may be easily removed and should not be construed as an encapsulant, as the term is used in the art of the present invention.

Another advantage of the present systems and methods relates to the size constraints of the motors. In some cases, the motors are designed to fit within well bores having very small diameters. The stators may therefore have to be implemented in a very small annular space (between the inner support and the outer housing) with very tight tolerances. In prior art methods, it is common to wrap a layer of insulating material around the inner support and to wrap the coils on this layer. Typically, it is necessary to helically wrap this layer of material on the inner support, and to overlap the seams to ensure that there are no gaps which could be more susceptible to short circuits. These seams (as well as wrinkles in the material) create ridges which take up some of the available annular space and make it more difficult to fit the inner stator assembly within the stator housing. By contrast, shrink-wrap material is easily installed without wrinkles or seams (the material can be provided in a continuous tubular form that is cut to the length of the stator) to produce an inner layer having consistent thickness and no gaps.

Still other advantages may be apparent to those of skill in the art. The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the present disclosure.

What is claimed is:

1. A method for securing coils of magnet wire to a support core in a linear motor for use in a wellbore, the method comprising:
   during assembly of the linear motor:
      providing a support core, wherein the support core is a hollow member adapted to receive a mover of the linear motor within an interior of the support core;
      positioning one or more coils of magnet wire at an exterior of the support core;
      positioning an outer layer of shrink-wrap material around the support core and the one or more coils of magnet wire; and
      heating the outer layer of shrink-wrap material and thereby causing the outer layer of shrink-wrap material to shrink and secure the one or more coils of magnet wire on the support core, and to provide compression against the one or more coils of magnet wire which holds the one or more coils of magnet wire securely against the support core.

2. The method of claim 1, further comprising, prior to positioning the one or more coils of magnet wire at the exterior of the support core, positioning an inner layer of material at the exterior of the support core and then positioning the one or more coils of magnet wire against the layer of non-slip material, wherein the inner layer of material inhibits axial movement of the one or more coils of magnet wire with respect to the support core and provides electrical insulation between the one or more coils of magnet wire and the support core.

3. The method of claim 2, wherein positioning the inner layer of material at the exterior of the support core comprises positioning an inner layer of shrink-wrap material around the support core and heating the inner layer of shrink-wrap material, thereby causing the inner layer of shrink-wrap material to shrink and thereby be secured to the support core.

4. The method of claim 1, wherein positioning the one or more coils of magnet wire at the exterior of the support core comprises winding the one or more coils of magnet wire around the support core.

5. The method of claim 1, wherein positioning the one or more coils of magnet wire at the exterior of the support core comprises pre-forming the one or more coils of magnet wire prior to installing the one or more coils of magnet wire on the support core.

6. The method of claim 1, further comprising positioning the support core with the one or more coils of magnet wire mounted thereon in a stator housing.

7. A system comprising:
   an electric submersible pump (ESP);
   an electric drive; and
   a power cable coupled between the electric drive and the ESP, wherein the power cable carries power from the electric drive to the ESP;
   wherein the ESP has a linear motor;
   wherein a stator of the linear motor includes
      a support core, wherein the support core is a hollow member adapted to receive a mover of the linear motor within an interior of the support core,
      one or more coils of magnet wire positioned at an exterior of the support core,
      an outer layer of shrink-wrap material positioned around the support core and the one or more coils of magnet wire, wherein the outer layer of shrink-wrap material is secured to the support core and the one or more coils of magnet wire, and wherein the outer layer of shrink-wrap material is compressed against the one or more coils of magnet wire and thereby holds the one or more coils of magnet wire securely against the support core.

8. The system of claim 7, wherein the stator further comprises a layer of non-slip material positioned between the support core and the one or more coils of magnet wire, wherein the non-slip material inhibits movement of the one or more coils of magnet wire with respect to the support core.

9. The system of claim 8, wherein the layer of non-slip material comprises an inner layer of shrink-wrap material that is secured to the support core.

10. The system of claim 7, wherein each of the one or more coils of magnet wire is wound around the support core.

11. The system of claim 7, wherein the one or more coils of magnet wire are encapsulant-free.

12. A stator for a linear motor of an electric submersible pump (ESP), wherein the stator comprises:
   a support core, wherein the support core is a hollow member adapted to receive a mover of the linear motor within an interior of the support core;
   one or more coils of magnet wire positioned at an exterior of the support core; and an outer layer of shrink-wrap material positioned around the support core and the one or more coils of magnet wire, wherein the outer layer of shrink-wrap material is secured to the support core and the one or more coils of magnet wire, and wherein the outer layer of shrink-wrap material is compressed against the one or more coils of magnet wire and thereby holds the one or more coils of magnet wire securely against the support core.

13. The stator of claim 12, further comprising a layer of non-slip material positioned between the support core and the one or more coils of magnet wire, wherein the non-slip material inhibits movement of the one or more coils of magnet wire with respect to the support core.

14. The stator of claim 13, wherein the layer of non-slip material comprises an inner layer of shrink-wrap material that is secured to the support core.

15. The stator of claim 12, wherein each of the one or more coils of magnet wire is wound around the support core.

16. The stator of claim 12, wherein the one or more coils of magnet wire are encapsulant-free.

* * * * *